United States Patent [19]

Barber

[11] 4,240,848
[45] Dec. 23, 1980

[54] SYSTEM FOR ALPHABETICALLY LABELLING ARTICLES

[75] Inventor: Donald T. Barber, Willowdale, Canada

[73] Assignee: Datafile Limited, Willowdale, Canada

[21] Appl. No.: 922,187

[22] Filed: Jul. 5, 1978

[51] Int. Cl.³ .................. B32B 31/10; B65C 1/04; G09F 3/02
[52] U.S. Cl. .................... 156/64; 40/23 A; 156/216; 156/277; 156/350; 156/351; 156/379; 156/384; 156/475; 156/DIG. 3; 156/DIG. 46; 156/DIG. 47; 206/459; 250/566; 250/571; 283/21; 283/36
[58] Field of Search ............. 40/23 A; 270/5, 8; 156/277, 216, 64, 350, 351, 379, 384, 475, DIG. 3, DIG. 46, DIG. 47; 206/459; 283/21, 36; 250/566, 571

[56] References Cited

U.S. PATENT DOCUMENTS

| | | | |
|---|---|---|---|
| 2,631,845 | 3/1953 | Zuckerman | 270/5 |
| 3,001,306 | 9/1961 | Wilkinson | 40/2 R |
| 3,567,909 | 3/1971 | Allen | 250/219 X |
| 3,691,662 | 9/1972 | Cunningham | 40/23 A |
| 3,760,161 | 9/1973 | Lohne et al. | 235/61.11 E |
| 3,801,408 | 4/1974 | Kuring et al. | 156/552 |
| 3,924,744 | 12/1975 | Heimann | 206/460 |
| 3,937,493 | 2/1976 | Fasbender | 40/23 A |
| 3,946,507 | 3/1976 | Fergg et al. | 40/2 R |
| 3,949,363 | 4/1976 | Holm | 340/146.3 C |
| 4,050,719 | 9/1977 | Cunningham | 283/36 |
| 4,183,779 | 1/1980 | Barber et al. | 156/361 |

FOREIGN PATENT DOCUMENTS 843183 6/1970 Canada.
925764 5/1973 Canada.

*Primary Examiner*—John T. Goolkasian
*Assistant Examiner*—Robert A. Dawson

[57] ABSTRACT

Alphabetic labelling of articles includes the use of a label having on a portion of its face a first set of indicia and on another portion of its face a second set of indicia which relate to the same subject matter as the first set. The second set of indicia is oriented in reverse and upside down relative to the first set. A machine readable code unique to the subject matter of the sets of indicia is located on one of the face portions of the label. The label when folded about its length isolates the two fields and on application to an article, provides visual identification of the article from two of its sides. The label may be provided with a machine readable indicia code which is representative of at least one indicium of either of the sets. An article labelling system may be adapted to read the indicia code and apply as controlled by the reading operation, one or more labels having letters corresponding to the coded indicia. Alphabetic labelling of articles by use of this special printed label may be done automatically by the system or the label may be applied manually.

5 Claims, 4 Drawing Figures

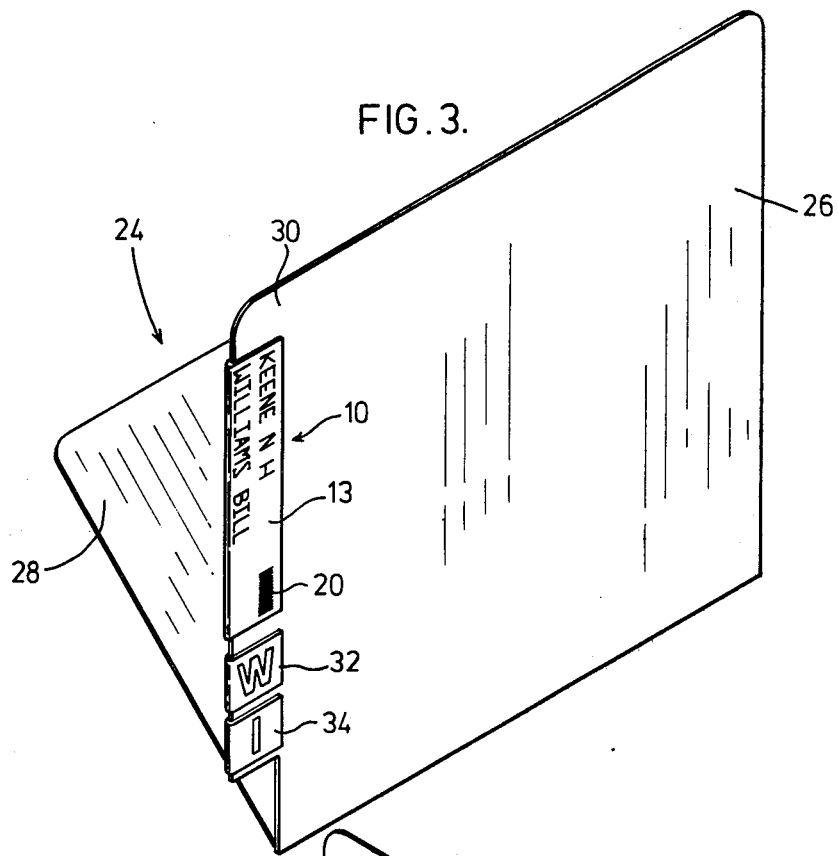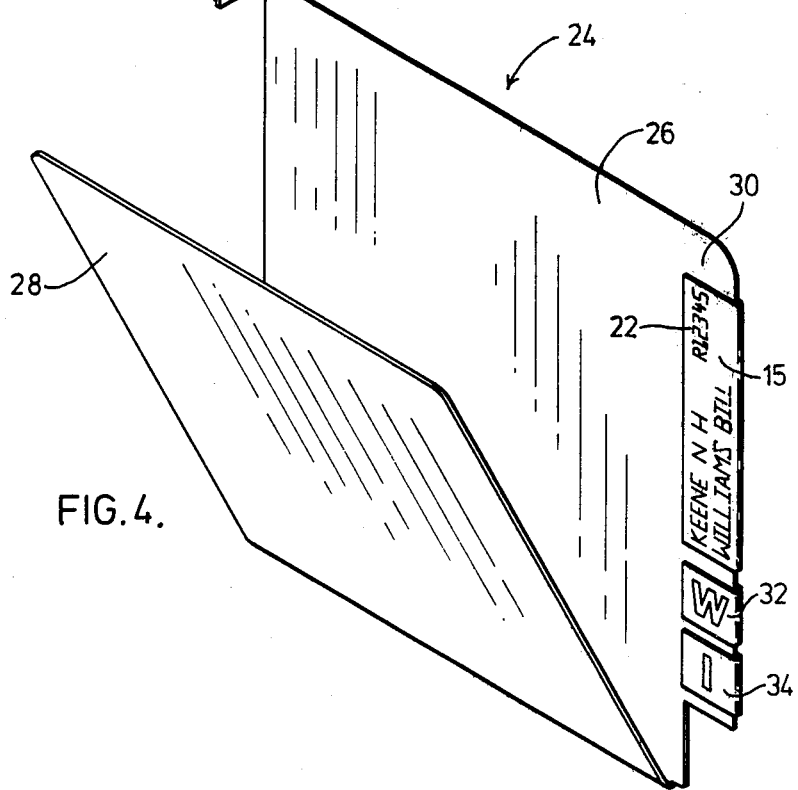

SYSTEM FOR ALPHABETICALLY LABELLING ARTICLES

FIELD OF THE INVENTION

This invention relates to labels for alphabetic labelling of article shelf filings, to printing such label and to labelling the articles with such labels.

BACKGROUND OF THE INVENTION

Broadly speaking there are two ways to file correspondence and other documents in offices. One way is in folders placed in drawer files; and the other way is in folders placed on shelf files. The drawer file system is a standard adopted by many business and government offices. In recent years, however, there has been a distinct trend away from drawer files to shelf files. Shelf files have several worthwhile advantages. There is the saving of space, because shelf files can go higher in view of reaching up to folders on shelves instead of having to reach over the top of the drawer to retrieve files from drawers. The drawers must be pulled out into an aisle, thus requiring wider aisles between rows. Usually there is a 30% space saving when changing from drawer files to shelf files. The shelf files eliminate the need to pull drawers out or push them in so that little physical effort is expended in withdrawing files from the shelf system and since all files are visible, access to them is fast and direct. With shelf filing systems, the file room is more compact so that there is less walking.

With the shelf filing system, the folder used is that commonly referred to as "End Tab" or "Side Tab" folder to distinguish it from the "Top Tab" folder used in drawer files. The end referred to is the edge of the folder that is visible when folders are positioned on a shelf. End tab folders may have the tab in several positions, for example, four inch top tab, four inch bottom tab, and full end tab.

There are two main systems or classes of coding files; that is, by the use of reference numbers, or by the use of the alphabetic names or subjects. The system to be discussed with respect to shelf filing to which this invention relates is alphabetic filing systems.

Computers are starting to be used for file room control where the file whereabouts is recorded and stored in computer memory. This is presently accomplished by keyboard entry of file reference numbers and its whereabouts is recorded in the computer memory. Such a system is subject to error and requires a great deal of time and a number of typists in the file room and at other locations throughout the office to record file "pass-ons."

The alphabetic labelling of file folders is usually based on a name or subject in association with which the file is opened. The label for the file may therefore show the person's name or the identity of the company, government office, etc. together with location such as City and Province or State and with subject files the main classification and sub-classification. Two such labels are usually printed in a typewriter and subsequently applied to both sides of the end tab folder. That system of alphabetic labelling of files requires considerable manual input and is slow and combersome.

The label according to this invention overcomes the above problems to provide an alphabetic label for articles such as files, envelopes, guidecards and anything that may be placed on shelves for reference. When applied to such an article, the label permits identification of the article from two of its sides. The label may be provided with a code which is machine readable and may be read by a reading device connected to a computer which is adapted to record the file whereabouts. The label may also be provided with a machine readable code that may program a labelling machine to apply other labels for identification.

SUMMARY OF THE INVENTION

The label for alphabetically labelling files has on a portion of its face a first set of indicia and on another portion of its face a second set of indicia which relates to the same subject matter as the first set. The second set of indicia is oriented in reverse and upside down relative to the first set. A machine readable code unique to the subject matter of the sets of indicia may be located on one of the face portions. The arrangement is such that when the label is folded along its length the portions of the face are isolated or remote from one another when the label is applied to an article. With this arrangement, the article is visually identifiable by the label from two of its sides.

The process for printing along a label, two sets of the indicia, comprises printing at least one line of a first set of indicia within a first field and in the same operation of printing along such label, printing at least one line parallel to the other lines of a second set of indicia backwards and upside down relative to the first set within a second field of the label. In the same printing operation, printing within one of said fields, a machine readable code unique to the subject matter of the sets of indicia. The machine readable code as it appears on the label, when applied to an article may be machine read to provide for computerized control of the file room. Additional information may be input to the computer manually or from summary sheet bearing machine readable information concerning the person or department to whom the folder is charged out. The particulars are machine read from the summary sheet and stored in computer memory. To facilitate security, people may be issued with cards bearing particulars which are machine readable. When a person requests a file, he has to produce his card which is machine read and if cleared the file is charged out and the person's particulars stored concerning file whereabouts.

The system for labelling articles with alphabetical labels comprises a printing device in which the described process can be practiced. Means is provided for passing label material through the printing device. Data input means is provided for directing the printing device in the subject matter to be printed on each label. The printing device is adapted to print along an upper first field of a label at least one line of a first set of indicia and print along a lower second field at least one line of a second set of indicia. The printing device prints each line of the second set backwards and upside down relative to the first set. The arrangement of fields is such that when a label is folded along its length, the first field is isolated from the second. The printing device also prints on the first field a machine readable indicium code representative of one or more indicium of a set. A label applying device may be provided for applying the printed labels to articles. The label applying device folds each such printed label along its length to isolate the fields and applies it. The label applying device has a reading device for reading such machine readable indicium code on the label applied. The label applying device has a supply of filing code labels, each representative of an alphabetical letter. The reading device, reads the machine readable indicium code to determine the selection by the label applying device of a filing code label from the supply which has a letter corresponding to a read coded indicium and applies the selected label on the article. The produced article therefore has a label identifying the subject matter of the article with one or more individual labels having letters corresponding to for example the first two letters of the person's name associated with the file. This provides ready access to an article in shelf filing systems where the individual labels having the letters may be colour coded to provide bands of colours along the filing system so that an article or a small group of articles may be visually recognizable from other articles in the system due to the combination of colour coded labels.

Alternatively, the labels as prepared by the printer device may be applied to the folders manually. The manual application may be further extended to include manually applying the additional colour coded labels according to a predetermined selection of the printed indicia.

The process for labelling a file folder by alphabetical listing comprises printing a label of the type discussed and applying the label to the side tab of a file folder with each field of the label on a side of the folder flap. The machine readable indicium is read; and applied to the file folder flap as controlled by the machine reading step, at least one colour coded label having an indicium corresponding to one of the coded indicium.

The system according to this invention provides an article such as a file folder having a listing on a label of the subject matter of the file and the addition as controlled by the machine readable indicium code on the printed label, of one or more individual filing code labels to provide a shelf filed article which has all the distinct advantages of shelf filing.

DESCRIPTION OF THE DRAWINGS

FIG. 3 is a view from one side of a file folder panel; and

FIG. 4 is a view from the other side of the file folder panel of FIG. 3.

DETAILED DESCRIPTION OF THE PREFERRED EMBODIMENTS

Figure 1:
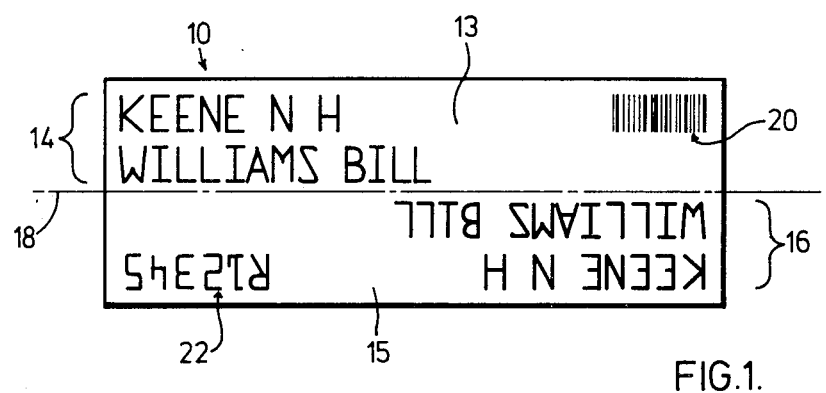
FIG. 1 is a view of a label according to a preferred embodiment of the invention.

FIG. 1 shows a label printed in a manner according to a preferred embodiment of this invention. The label 10 is rectangular in shape. On a portion of a first field or its face 12 it has a first set of indicia encompassed by bracket 14. On the outer line, the name of the City and State, Keen N.H. is printed. On the first line adjacent the central portion of the label 10, the name of the person, Williams, Bill, in association with which a file folder has been opened, is printed. The second set of indicia is encompassed by bracket 16 is identical to and printed in rows parallel to the rows of the first set of indicia 14. The second set of indicia is printed upside down and backwards relative to the first set of indicia.

In locating the two sets of indicia in the manner shown in FIG. 1, they are positioned in upper and lower fields as identified on each side of an imaginery fold line shown in dot and designated 18. The two fields extend the length of label 10 and in this particular embodiment, they are beside one another and are co-extensive with each other. In the upper right hand corner of the label's first field 13, the machine readable indicium code 20 represents the first two initials WI of the person's name. The code is shown in "Code 39" bar code format including start-stop portions and intermediate portions indicating and representative of, when machine read, the designated preselected letters WI. In the lower left hand corner of the label's second field 15, a machine readable code 22, in this embodiment made up of optical character recognition markings, represents the subject matter of the label and therefore the subject matter of the article to which the label is to be applied. The code 22 is read during charge out of, for example, file folders in the control of the file room.

The label 10 when used on a file folder is preferrably coated with a protective layer of material which may be laid over the label after printing. The protective material may be of a thin transparent sheet with an adhesive backing such as a sheet of "Mylar" (trade mark) which adheres to the surface of the label. To assist in the application of a label to an article, the back of the label may have an adhesive material applied thereto which is pressure sensitive. During the printing and handling of the label, it may have a protective backing. The backing is peeled therefrom to expose the adhesive for application of the label to the article. In applying the label as mentioned, it may be folded along line 18 extending the label's length to isolate fields 13 and 15.

The label 10 as shown in FIG. 3 is applied to an end tab of a file folder generally designated 24 having file folder flaps 26 and 28. The end tab of the folder 24 juts outwardly of flap 26 in the form of tab 30 which is integral with flap 26. Label 10, as folded about imaginery line 18, is applied to the folder so that when read from its rearside the first set of indicia 14 is readily read. As shown in FIG. 4, the second set of indicia 16 is readily read from the other side of the file. This facilitates file folder reference from either direction when looking for files in shelf filing systems.

The bar code 20 on label 10 as mentioned designates the initials WI of the name and controls the labelling machine application of singular filing code labels 32 and 34. As can be seen in FIGS. 3 and 4, labels 32 and 34 have the initials repeated on each side of its central fold to provide reference to the file from either side. The labels may be colour coded and of the type described and claimed in applicant's copending U.S. patent application Ser. No. 775,687 filed Mar. 9, 1977.

The label 10 may according to a preferred embodiment of the invention, be printed in a single operation. As the printer passes along relative to the label 10 from left to right, vertical segments of both rows of first set of indicia 14 are simultaneously printed. On moving across the label 10, the first indicium "L" of the second set is printed upside down and reverse order in line with the indicium "L" of the first set. Similarly, as the first set of indicia 14 is being printed, the code 22 is also being printed in its upside down and reverse order manner directly below and in line with the upper indicium columns. The bar code 20 is printed as the second set of indicia 16 is being printed. The process therefore prints the entire label in a single pass.

An apparatus which has been found to be particularly suitable for this type of printing operation is that sold by Markem Corporation of Keen, N.H., and sold under the trade mark "Scanmark." This printer a model U.1235 has been modified to print two rows of indicia in an upright manner and two underlying rows of indicia in an upside down manner. This device as it has been modified has the capacity to type four lines of the label in the following manner. A constantly revolving cylinder has four lines of type embossed on the surface. The cylinder is positioned vertically. The lines of type are positioned horizontally around the cylinder so that they print the four lines of typing required to produce the combined label 10. The top two lines are embossed on the cylinder in their standard upright position and the bottom two lines are embossed upside down and backwards. For example, the A on the second line of embossed type would be in perpendicular alignment with the A on the first line. On the third line of embossed type, the A would also be perpendicular alignment but would be upside down. The fourth line of type would be identical to the third. All the alphabet letters A through Z and the numbers 0 through 9 together with special characters such as bar code would be on the drum. The bar code type may be that well known in the field as "Code 39." The letters A through Z and 0 through 9 may be in machine readable optical character recognition (OCR) format. This permits printing of machine readable sets of indicia and code 22.

The Markham printer has been designed so that the rolls of self adhesive labels attached to the backing paper are fed across the cylinder. In front of the label, a one time carbon-like ribbon is also fed across the cylinder. The labels and the one time carbon-like material are pulled past the cylinder by the action of a stepper motor in an intermittent start-stop movement. Four hammers on the printer are timed to strike the four lines of embossed letters on the constantly revolving cylinder. The label and carbon-like ribbon are held in position until the printing requirements of all four lines of type have been met. The printing sequence for each label is stored in the buffer memory of the printer. This buffer memory for each label is programmed from the keyboard of the Markham printer or alternately from a computer generated magnetic tape by a tape device such as a "Mitron" (trade mark) MDRS-9 Unit. This is distributed by Mitron Systems Corporation of Columbia, Md. The embossed cylinder is kept at a constant high temperature so that when the hammer strikes the carbon-like paper there is an actual transfer of carbon-like coating to the label. Thus printed in this hotstamp-like process, the carbon-like material is permanently bounded to the paper. As mentioned, when the label is used on the files in other fields where permanence is required, immediately following the printing operation, the label may be laminated with a transparent film of "Mylar" to protect the label from wear.

Use of the Markham printer or similar device therefore provides in a single pass on the label the printing of both sets of indicia and machine readable codes. It is understood however, that the label 10 may also be prepared where the upper half is typed and the label withdrawn from the printing unit inverted or turned upside down and then the second half of the material printed.

Figure 2:
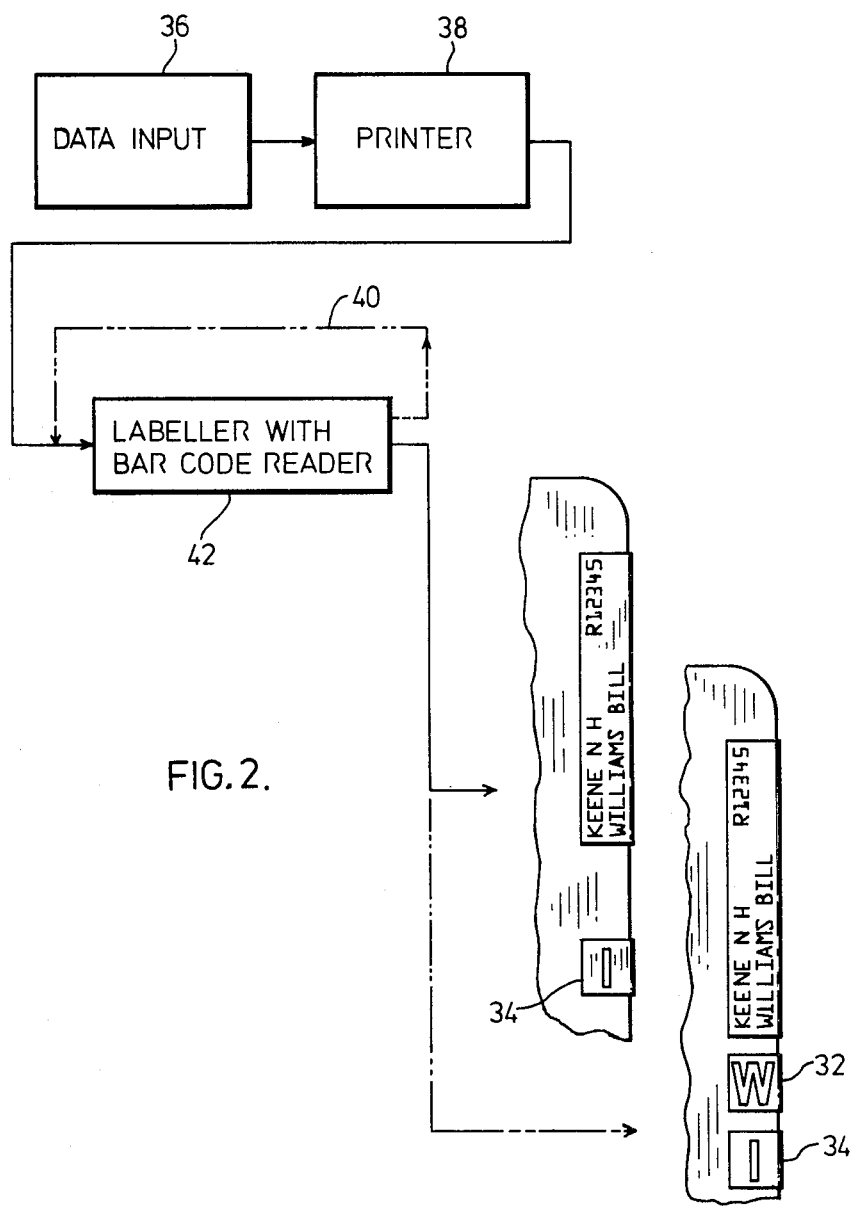
FIG. 2 is a block diagram of the components of the system for labelling of files according to a preferred embodiment where segments of the file folder tab have the file labels built up thereupon.

Turning to FIG. 2 according to a preferred embodiment, the aforementioned Miltron System MDRS-9 is used for data input designated by block 36 to direct the printer 38 which according to a preferred embodiment is the above discussed modified "Scanmark" printer. The memory of the data input terminal 36 may include on a magnetic tape or disc a listing of several clients by name, address and other pertinent information which may be included in the sets of indicia to be printed. The printer 38 is activated and on receiving input from the data bank 36, commences printing the two sets of indicia together with code 22. The printer is programmed to determine the coded indicia from the input and prints bar code 20 to represent the first two initials of the person's name. On completion of the printing of the label, the printed labels may remain on the paper backing and re-rolled.

As mentioned, the printed labels may be applied to file folders by hand where each label would be removed from the roll, folded and affixed to the end tab. Alternatively the label application can be mechanized by the use of an automatic labeller such as the unit described in applicant's copending U.S. patent application 830,118 of Sept. 2, 1977 now U.S. Pat. No. 4,183,779. The roll of printed labels are loaded on the machine or labeller designated by block 42. The labeller applies the labels 10 to the files to place the label on the file tab 30. Immediately after the label is applied to its folder it is routed through a bar code reader. The bar code on the rear of the label is read to determine what indicia were coded. The labeller 42 has a supply of filing code labels which are on separate rolls, each roll having labels of a particular letter of the alphabet. The bar code reader is adapted to signal the labeller to apply labels having the coded indicia on the file folder. To decrease the number of label applying stations on labeller 42, the alphabet may be divided in two. In the folder's first pass through the labeller, the printed label 10 and any of the coded letters of the group A through M are applied at their proper positions as shown in FIG. 3A. On the second pass through the labeller as represented by dotted line 40, the bar code is read again and any of the remaining coded letters of the group N through Z are applied at their proper position as shown in FIG. 3B.

The labeller 42 can be programmed such that it positions the labels 32 and 34 in their respective positions as determined by the sequence of the letters as they are coded in the bar code 20.

This automatic labelling process provides a totally mechanized system for labelling files according to the alphabet where each file tab has a label 10 indicating visually and in machine readable form the subject matter of the file. Together with colour coded labels 32 and 34, a shelf filing system provides an advanced form of file reference in the art of colour coding of files as discussed in applicant's aforementioned copending U.S. patent application Ser. No. 775,687.

It is appreciated that this description of the preferred embodiment is not intended to be restrictive of the kind of labels that may be produced in the manner described. For example, if the address is not needed, only the two centre lines of the embossed type would be activated on the Markham printer, in which case, the top and bottom lines of the type in label 10 would be eliminated.

Another variation of the labelling of alphabetic folders is for subject filing applications having primary subject classification, secondary classification and tertiary classification. The printer is provided with alternate programming buffered memory and an alternate embossed cylinder with the top three lines of embossed type right side up and the bottom line upside down. The top printing position of the label would print the primary classification, the second printing position print the secondary classification and the third printing position on the drum, print the tertiary classification. The label would be applied to the folder with only the fourth line showing on the back of the folder, with the primary, secondary and tertiary classifications in a first field and other tertiary classification in a second field so that the label is folded about its length offset from its centre.

As mentioned, the sets of indicia may be printed in machine readable form such as OCR. This may be useful in some computerized file control systems where there is no data base to relate the read code 22 to the subject matter of the file. It is therefore useful in such instances to read into the computer memory the code 22 and the machine readable indicia on the label. On recall, the computer print-out will therefore show the code and the subject matter corresponding to that code. However, where the computer installation permits, a data base may be built up containing code 22 and the corresponding subject matter for all files concerned. With this set-up it would be necessary to read into the computer memory the indicia printed on the label.

A further variation of the label shown is to provide a narrow colour band along the fold area 18 of the label 10. When such a label is applied to a file folder tab, the colour bar provides colour identification of the folder when viewed from its end. This is particularly useful in large filing systems where mistakes are readily visually noticed. Due to wrap around feature of the label as applied to a folder tab, the colour band is not damaged, nor removed, nor dislocated during handling of the folder.

The label according to this invention therefore provides a label for a file where the subject matter of the file is readily identifiable from either side of the file. The bar code on the label or other machine readable code indicative of the selected indicia directs a labeller to apply a label selected from the supply of filing code labels to the file tab. The file label 10 may also carry a code which is machine readable and representative of the subject matter of the label 10. This computerized code which may be in OCR format can be machine read to facilitate computerized control of the file room. This can be accomplished by providing a device which can read the OCR markings 22 and by buffer transfer such information to computer memory storage and with this reading of the file code, manual entry or machine reading of particulars from a summary sheet with corresponding bar code may be done to record information file whereabouts.

Several preferred embodiments of the invention have been described herein in detail. It will be understood by those skilled in the art that variations may be made thereto without departing from the spirit of the invention or the scope of the appended claims.

The embodiments of the invention in which an exclusive property or privilege is claimed are defined as follows:

1. A process for labelling a system of file folders comprising printing labels for the system where each printed label is different from other printed labels, each label having first and second fields extending its length and printed in a first field a first set of indicia and printed in a second field a second set of indicia where said second set is printed backwards and upside down relative to the first set, the first and second set of indicia being the same and peculiar to that printed label, in the same operation printing in said first label field a machine readable indicia code representative of a portion of said first set of indicia and oriented for machine reading along label's length, applying such label to a file folder by folding and locating it on a folder flap with said first label field located for application to the rear side of such folder flap; each set of indicia having been printed to appear upright in its respective field with said label folded along a fold line between said fields as applied to such folder flap, machine reading such machine readable indicia code on the label and controlling by such reading step a labeller's application to such file folder flap of individual colour coded labels, each colour coded label as applied having an indicium corresponding to one of such coded indicia, said process making all file folders of said system distinguishable from one another by their labelling.

2. A process of claim 1 wherein prior to applying such labels to a folder flap, applying to such label a thin transparent protective coating to cover and protect the label print.

3. A process of claim 1 wherein said machine readable indicium code represents two indicia of said first set, two of said colour coded labels being arranged on such file flap in the order determined by the sequence of the indicia in said machine readable indicium code.

4. A process of claim 3 wherein for each indicia set two rows are printed.

5. A process of claim 4 wherein the first row is printed adjacent the fold area when such label is folded along its length.

* * * * *